United States Patent [19]

Van Etten

[11] 4,053,882
[45] Oct. 11, 1977

[54] POLARIZATION RADAR METHOD AND SYSTEM

[75] Inventor: Paul Van Etten, Clinton, N.Y.

[73] Assignee: The United States of America as represented by the Secretary of the Air Force, Washington, D.C.

[21] Appl. No.: 660,201

[22] Filed: Feb. 23, 1976

[51] Int. Cl.² ............................................. G01S 9/02
[52] U.S. Cl. ........................... 343/5 SA; 343/17.1 R; 343/100 PE
[58] Field of Search .......... 343/5 SA, 17.1 R, 100 PE

[56] References Cited

U.S. PATENT DOCUMENTS

| 3,689,924 | 9/1972 | Caruso, Jr. ................ 343/100 PE X |
| 3,772,689 | 11/1973 | Root, Jr. ....................... 343/5 SA X |
| 3,918,055 | 11/1975 | Shimizu et al. ........... 343/100 PE X |

Primary Examiner—T.H. Tubbesing
Attorney, Agent, or Firm—Joseph E. Rusz; George Fine

[57] ABSTRACT

A polarization radar method and system employs polarization discrimination to obtain target-to-clutter enhancement. The polarization of the radar is rotated at very fast rates. The polarization is rotated at least 360° during one pulse and discrimination is obtained with a single pulse operation. In the system, the receiver is tuned to a frequency that was not radiated by the radar's transmitting antenna.

8 Claims, 17 Drawing Figures

POLARIZATION RADAR METHOD AND SYSTEM

STATEMENT OF GOVERNMENT INTEREST

The invention described herein may be manufactured and used by or for the Government for governmental purposes without the payment of any royalty thereon.

BACKGROUND OF THE INVENTION

A radar system transmits energy to the surrounding environment in which a specific target or class of targets is desired to be detected. If the environment contains unwanted radar returns such as weather clutter, sea clutter and land clutter, the desired target or targets are generally masked or obscured by these rather strong returns. To overcome this problem, signal processing can be employed to enhance the target-to-clutter power ratio. However, to employ signal processing a discriminant is required — that the target contain a unique feature that the clutter does not contain. Historically, doppler filters have been employed for target-to-clutter enhancement. A moving target has a doppler frequency offset where nonmoving clutter can be rejected by a doppler filter. If, however, the target and clutter have the same velocity components, the velocity discriminant is lacking and the target-to-clutter cannot be enhanced by doppler processing.

The method and system as described herein employs a discriminant which is derived from the target's unique shape and radar cross section as a function of the polarization of the radar. The polarization of the transmitted waveform is rotated very fast at a constant angular rate. As described in detail hereinafter the polarization is rotated more than 360° during the transmitted pulsed waveform. The received waveform from the target, if received with the same polarization that was transmitted will be modulated by the target. The unique modulation will be a function of the target's polarization behavior. Under the condition that the energy received has the same polarization as the transmitted polarization and both are rotating at a constant linear rate, the energy in the receiver will contain frequency components that were not transmitted. Thus, for some types of targets a receiver may be tuned to a frequency band that was not transmitted and target discrimination may be obtained.

The present invention provides features such as a novel radar system which enhances target-to-clutter visibility even for slow or nonmoving targets. Further, the method can be employed for target identification. A new principle is utilized for radiating an electromagnetic waveform where the polarization is rotated at a very fast rate heretofore unobtainable with conventional polarizers. In addition, there is presented a new principle for effectively receiving with a fast rotating polarization by employing signal processing techniques. There is also provided a signal processing technique for obtaining target-to-clutter enhancement while achieving a maximum target signal-to-receiver noise ratio. Still further, there can be performed the enhancement and/or identification with a single pulse. Finally, the aforementioned feature may be achieved with a radar system in which the signal path in the radar remains constant whereby other forms of signal processing can also be used simultaneously.

The present radar system permits detecting targets which are obscured by strong unwanted clutter returns. The principle herein does not require that the target be moving. Also the identification of target classes can be performed. The concepts can be employed with radar for broad applications including surveillance, target tracking, weapon guidance, and target identification in both ground-based and space-borne radars.

SUMMARY OF THE INVENTION

A polarization radar method and system is provided in which a linearly polarized field is rotated more than 360° during the transmitted pulse waveform at an angular rate of 60 million radians per second. Proper phasing is provided by a short-slot hybrid junction which has the property that each time the energy passes through the slot in either direction the phase of the signal is advanced 90°. Under the condition that the received energy has the same polarization as the transmitted polarization and both are rotating at a constant linear rate, the energy in the receiver may contain components that were not transmitted. Acute distinction between targets and background clutter is one of the major aims of the invention.

DETAILED DESCRIPTION OF THE PREFERRED EMBODIMENTS

As stated hereinbefore, the polarization is rotated at a very fast constant angular rate, i.e., 60 million radians per second. Conventional polarizers employ components such as mechanical phase shifters and in general cannot support a fast linear angular rate. A unique technique is hereinafter described to perform this function.

Figure 1:
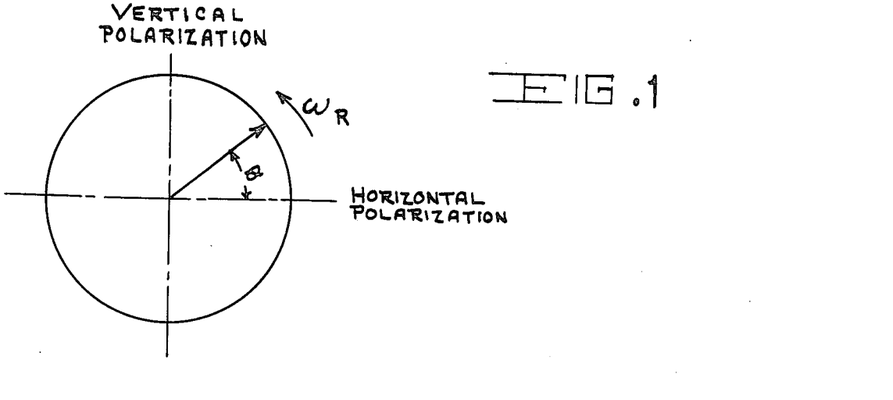
FIG. 1 illustrates the linear rotation of polarization.
Figure 2:
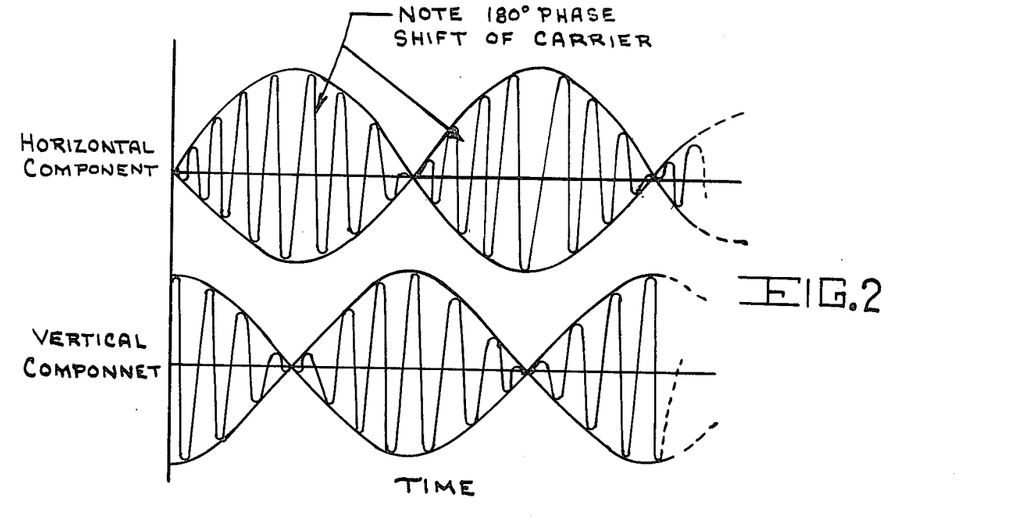
FIG. 2 shows the horizontal and vertical components of the linearly rotating polarization.

As seen in FIG. 1, the polarization is rotated at a rate of $\omega_R$ and the polarization has a reference angle of $\theta$. As the polarization is rotated, both the vertical and horizontal components are seen in FIG. 2. Both waveforms are equivalent to double-sideband suppressed carrier modulation where a relative 90° phase shift appears between the envelopes of the modulation.

Figure 3:
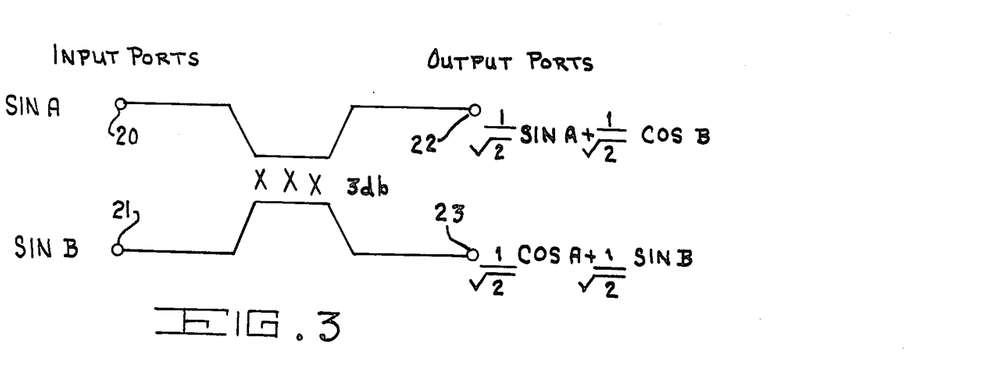
FIG. 3 shows in diagrammatic form a 3 dB short-slot hybrid junction with input and output signals.

The method and system employ a 3 dB short-slot hybrid junction which is illustrated in FIG. 3. The short-slot hybrid has the property that each time the energy passes through the slot in either direction the phase of the signal is advanced 90°. Input ports 20 and 21 receive SIN A and SIN B, respectively. Output ports 22 and 23 provide signals $1/\sqrt{2}$ SIN A + $1/\sqrt{2}$ COS B, $1/\sqrt{2}$ COS A + $1/\sqrt{2}$ SIN B respectively.

Figures 4, 5:
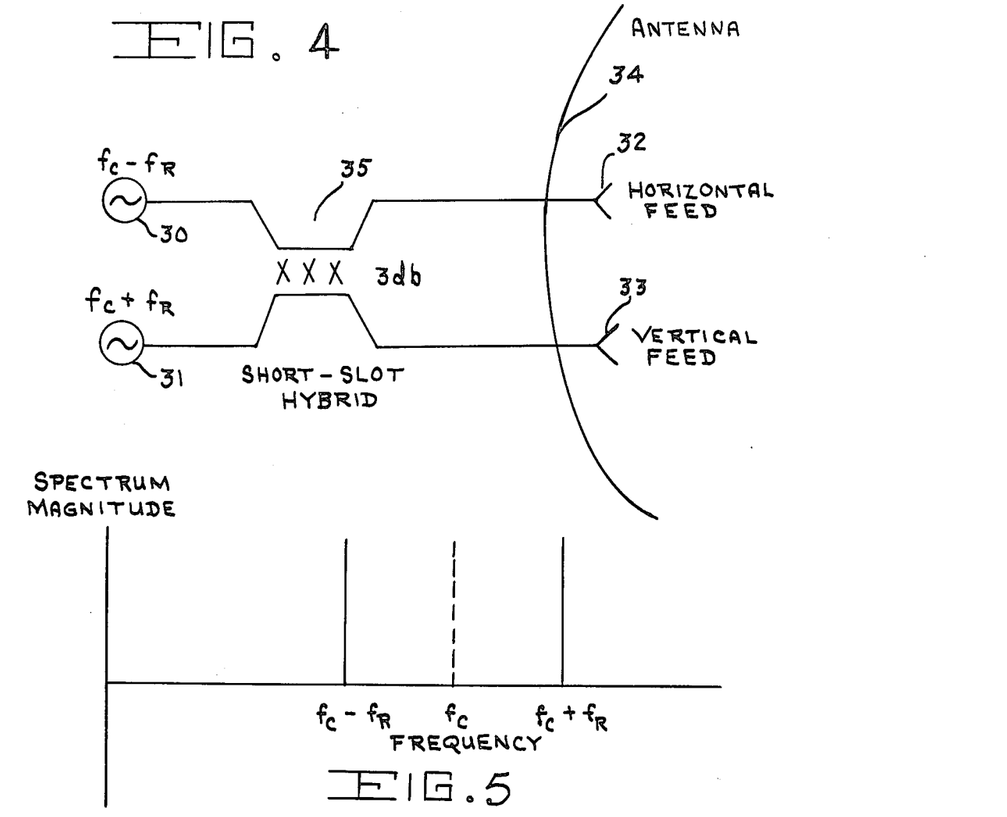
FIG. 4 illustrates the structure for generation and radiation of a linearly rotating polarization.
FIG. 5 shows the spectrum magnitude of either the vertical or horizontal components of the linearly rotating polarization.

Now referring to FIG. 4, if the waveforms of generators 30 and 31 fed to short slot hybrid 35 are:

$$e_1(t) = \text{Sin}(\omega_c t - \omega_R t)$$

$$e_2(t) = \text{Sin}(\omega_c t + \omega_R t)$$

where $\omega_R = 2\pi f_R$
$\omega_c = 2\pi f_c$
$f_R$ = Polarization Rotation Frequency
$f_c$ = Carrier Frequency The waveforms at vertical and horizontal feeds 32 and 33 of of antenna 34 are:

$$e_v(t) = \sqrt{2}\,\text{Sin}(\omega_c t + \pi/4)\,\text{Cos}(\omega_R t - \pi/4)$$

$$e_H(t) = \sqrt{2}\,\text{Sin}(\omega_c t + \pi/4)\,\text{Cos}(\omega_R t + \pi/4)$$

Under this condition the linear polarization will rotate at an angular rate of $\omega_R = 2\pi f_R$. The sense of rotation (i.e., clockwise or counter-clockwise) may be reversed by simply reversing the generators or the frequencies of the generators.

The magnitude of the radiated spectrum is shown in FIG. 5. Again note that the spectrum is of a double sideband suppressed-carried waveform.

As is common practice with radars, the generators (or transmitters) are amplitude pulse modulated. Denoting the amplitude pulse modulation by $f(t)$ the waveforms at the inputs to the short-slot hybrid are:

$$g_2(t) = f(t)e_1(t)$$

$$g_2(t) = f(t)e_2(t)$$

or $$g_1(t) = f(t)\,\text{Sin}(\omega_c t - \omega_R t)$$

$$g_2(t) = f(t)\,\text{Sin}(\omega_c t + \omega_R t)$$

The pulsed waveforms at the vertical and horizontal feeds of antenna 34 are now:

$$g_v(t) = f(t)\sqrt{2}\,\text{Sin}(\omega_c t + \pi/4)\,\text{Cos}(\omega_R t - \pi/4)$$

$$g_h(t) = f(t)\sqrt{2}\,\text{Sin}(\omega_c t + \pi/4\,\text{Cos}(\omega_R t + \pi/4)$$

Denoting the spectrum of $f(t)$ by $F(\omega)$ and $\rightarrow$ as the Fourier transform, then:

$$f(t) \rightarrow F(\omega).$$

Using the relationship:

$$x(t)y(t) \rightarrow X(\omega) * Y(\omega)$$

where $$x(t)y(t) \rightarrow X(\omega) * Y(\omega)$$

$$y(t) \rightarrow Y(\omega)$$

and * denotes convolution, the spectrums at the feeds are:

$$G_v(\omega) = F(\omega) * E_v(\omega)$$

$$G_H(\omega) = F(\omega) * E_H(\omega)$$

where:

$$e_v(t) \rightarrow E_v(\omega)$$

$$e_H(t) \rightarrow E_H(\omega).$$

Figure 6:
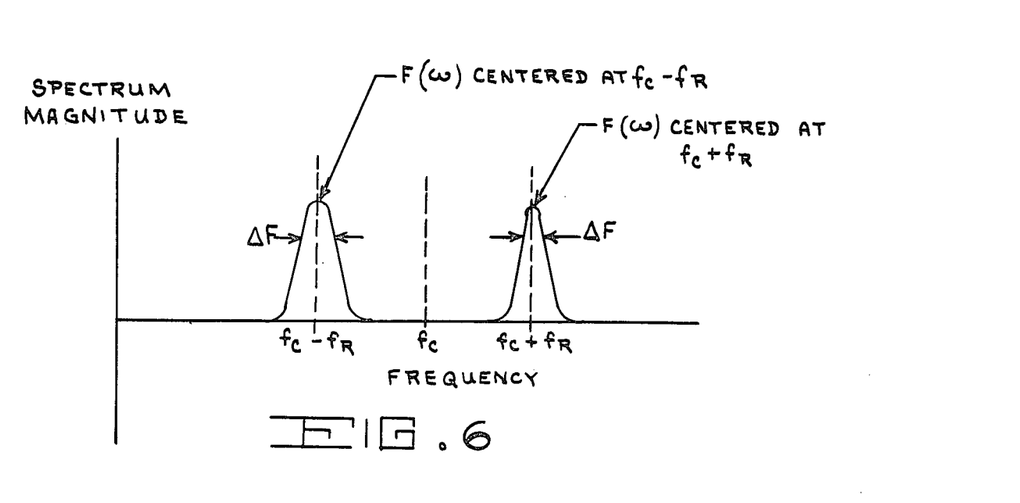
FIG. 6 shows the spectrum magnitude of pulsed waveforms at either the horizontal or vertical feeds.

The general magnitude of the spectrum of the pulse waveform at the feeds is seen in FIG. 6. An important factor of this disclosure is that the spectrum width of $F(\omega)$ denoted as $\Delta f$ be less than $2f_R$. That is to say that the pulse spectrum, $f(\omega)$, centered at $f_c \pm f_R$ will not overlap the pulse spectrum, $F(\omega)$, centered at $f_c$. To specify this condition the pulsewidth, T, must in general meet the requirements:

$$T \geq 1/f_R.$$

This implies that the polarization must be rotated at least 360° during the pulse. Because pulsed radars have a causal time waveform output the spectrum will be continuous over all frequencies. Therefore the two spectrums $F(\omega)$ centered at $f_c - f_R$ and $F(\omega)$ centered at $(f_c + f_R)$ will overlap but the spectrum magnitude and energy content are small enough for a practical radar design that can be considered negligible. For example, with a typical pulse waveform the polarization may rotate four revolutions during the pulse duration. In this example:

$$T = 4/f_R.$$

Figure 7:
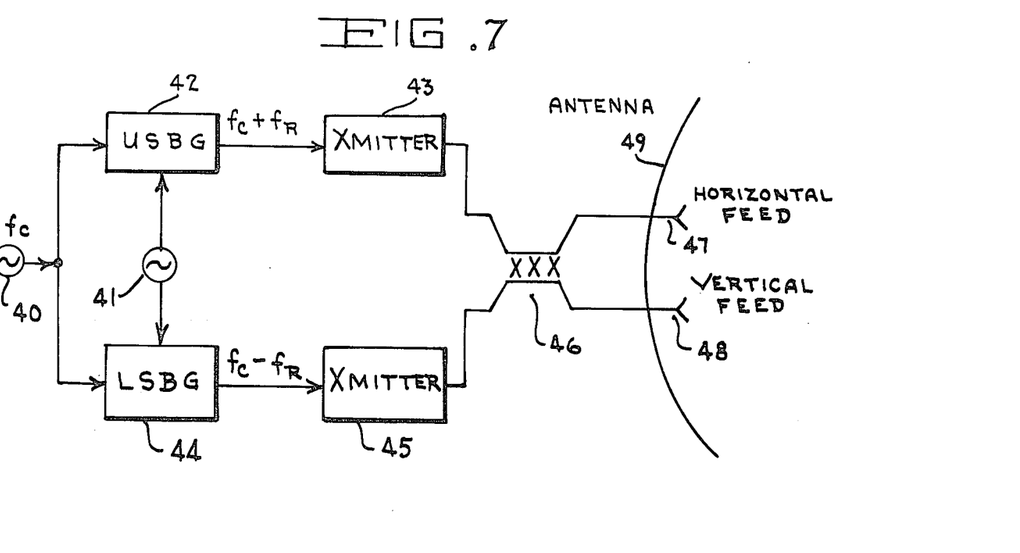
FIG. 7 illustrates in block diagram form a radar generating and radiating linearly rotating polarization at an angular rate of $W_R$.

Two different configurations are given for the transmitter. The first, as seen in FIG. 4, employs two pulsed oscillators (i.e., magnetrons) and was previously described. The second technique and system are seen in FIG. 7. Here a coherent transmitter is obtained with both the carrier frequency and polarization rotation frequency oscillators available for reference signals to the receiver. Both oscillators 40 and 41 are mixed in single sideband generators where upper sideband generator (USBG) 42 feeds transmitter 43 and lower sideband generator (LSBG) 44 feeds transmitter 45. The transmitter outputs are processed as in the first configuration by utilizing slot 46 and horizontal and vertical feeds 47 and 48 associated with antenna 49.

With the linear rotating polarization transmitted as discussed above, the polarization modulation of the target is now considered. Of concern is that different shape targets will produce different and unique modulations on the RF carrier as a result of rotating the polarization. Because electro-magnetic backscatter is highly complex, two simple target models are used to illustrate the principle of discrimination.

Figures 8, 9:
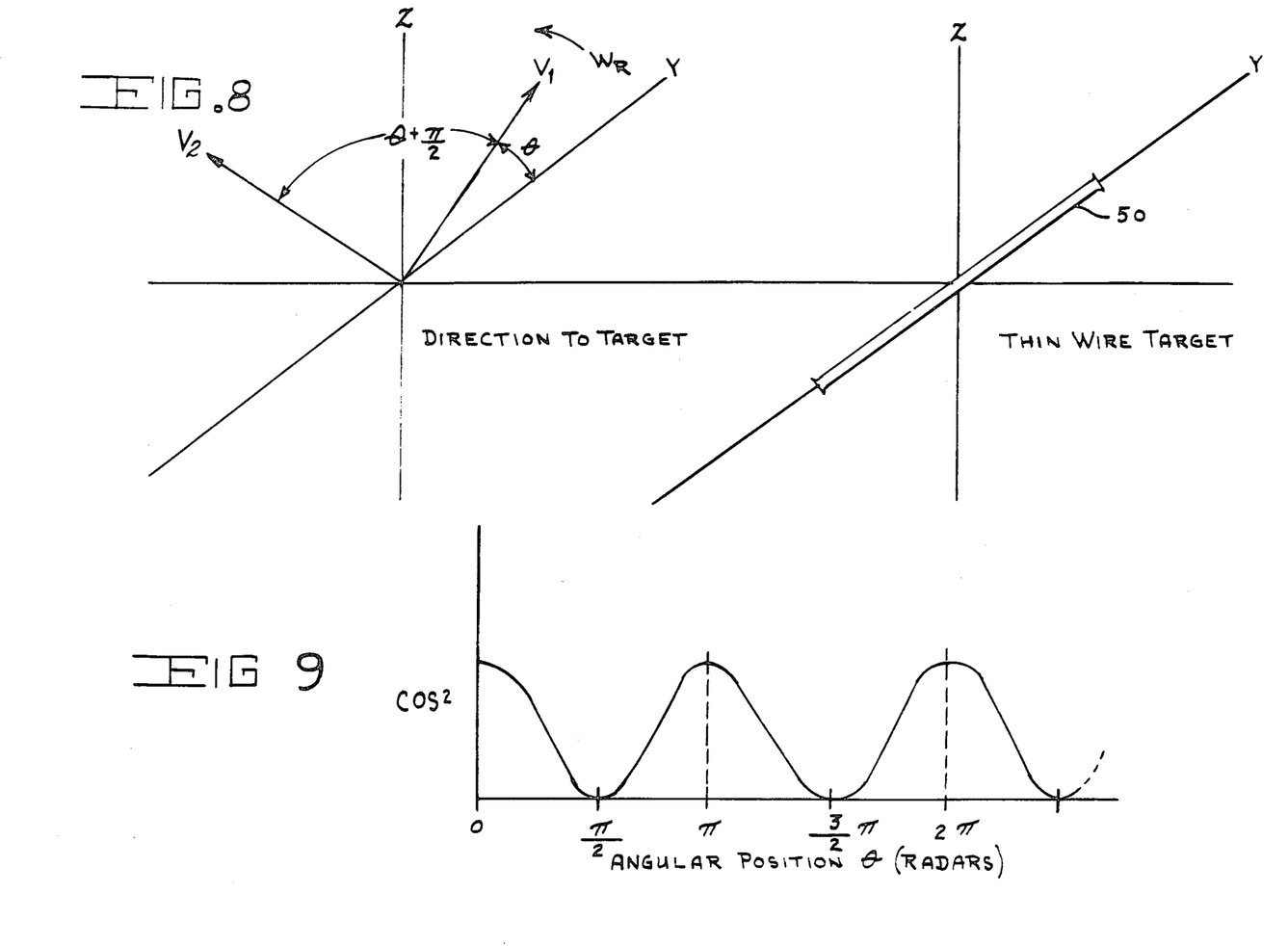
FIG. 8 shows the geometry and rotation of the electromagnetic field and target.
FIG. 9 shows a thin wire target response as a function of polarization angle $\theta$ for parallel polarization.

The first target model is a thin wire which is normal to the propagation direction of radar energy. The orientation of the thin wire to the radar is seen in FIG. 8. The transmitted polarization angle is $\theta$ which is increasing linearly with time. When the backscatter from the thin wire is received with the same polarization the receive-transmit polarizations are said to be parallel polarized. If the received polarization is orthogonal to the transmitted polarization the transmit-receive polarizations are said to be cross-polarized (i.e., transmit at angle $\theta$, and receive at angle $\theta + 90°$).

When the transmitted electromagnetic field impinges upon wire 50 the current flowing in the wire will vary with the polarization as Cos $\theta$. The current flowing on the wire will produce reradiation which is polarized at the angle of the wire. Therefore when receiving the same polarization that was transmitted, the received component will also vary as Cos $\theta$. The above two will modulate the carrier with Cos$^2\theta$ as plotted in FIG. 9. If the backscatter is received with the cross-polarization the modulation will be Cos $\theta$ Sin $\theta$.

If the polarization rotates at a linear rate of $\omega_R$ the polarization angle, as a function of time, is:

$$\phi(t) = \omega_R t.$$

The parallel polarization modulation from thin wire 50 is $$M_p(t) = \text{Cos}^2 (\omega_R t)$$

and the cross-polarized modulation from the thin wire is $$M_c(t) \text{ Cos } (\omega_R t) \text{ Sin } (\omega_R t).$$

Figure 10:
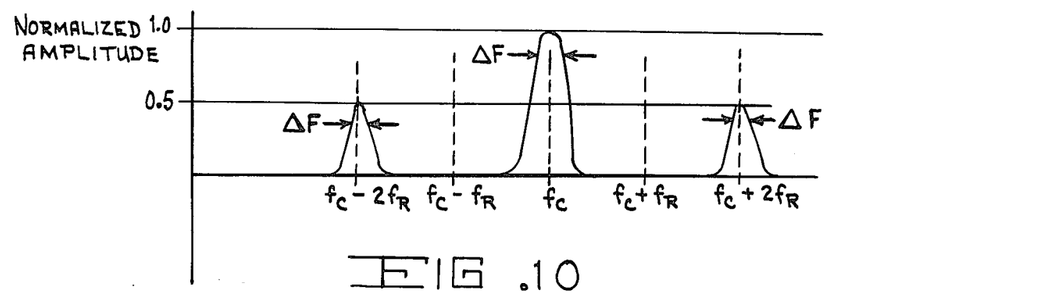
FIG. 10 shows the spectrum of thin wire at receiver for parallel polarization.
Figure 11:
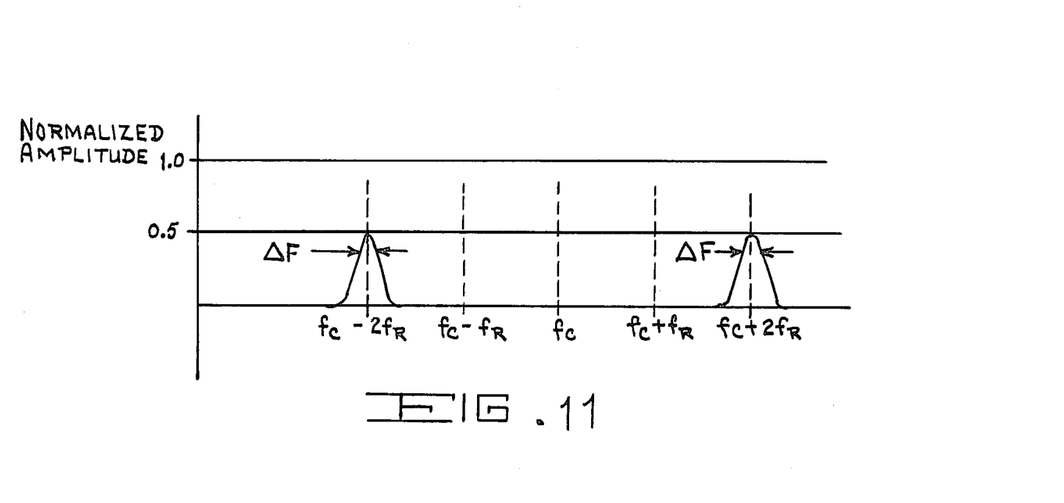
FIG. 11 shows the spectrum of thin wire at receiver for cross-polarization.

When these target polarization modulations are impressed on a pulse carrier the received spectrums are seen in FIGS. 10 and 11. Notice that energy appears in the spectrum at frequencies about $f_c - 2f_R$ and $f_c + 2f_R$, however no energy was transmitted at these frequency regions. As will be described in detail later the receiver will be tuned to a frequency that was not radiated by the transmitter.

Figure 12:
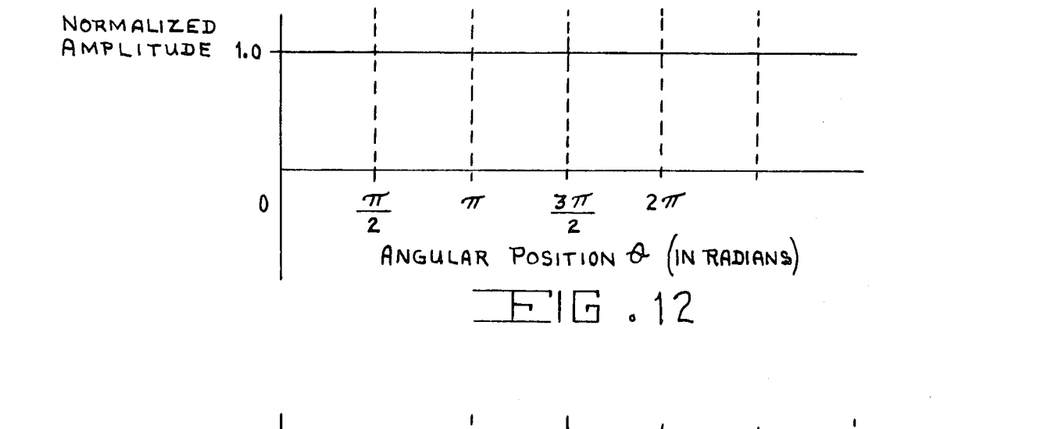
FIG. 12 shows sphere target response as a function of polarization angle $\theta$ for parallel polarization.
Figure 13:
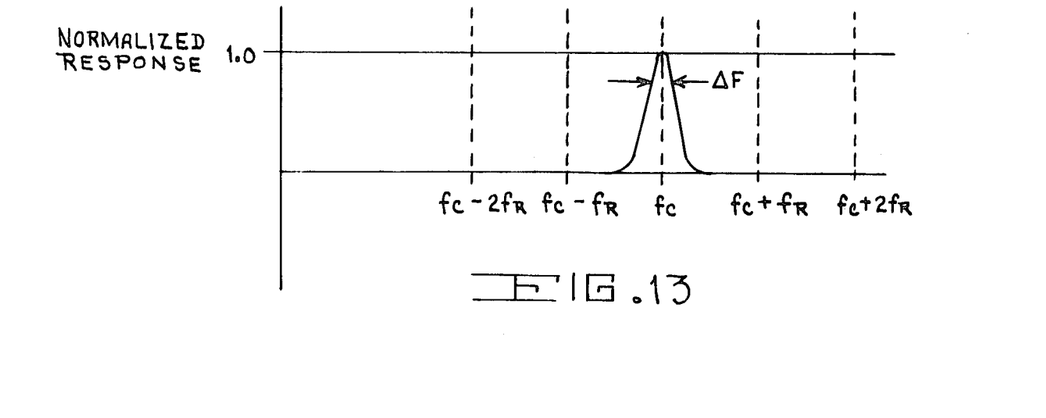
FIG. 13 shows the spectrum of sphere at receiver for parallel-polarization.
Figure 14:
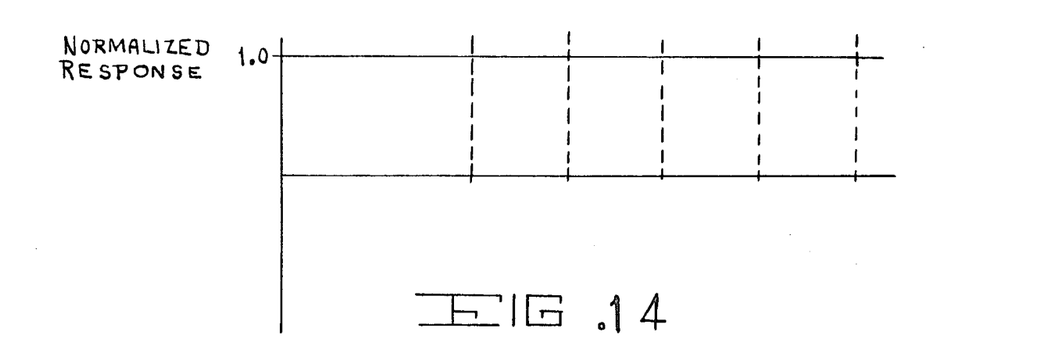
FIG. 14 shows the spectrum of sphere at receiver for cross-polarization (note zero response)

The second target model to be described is a sphere. The polarization modulation of a sphere is simple to describe because the radar cross-section is constant with polarization angle and is plotted in FIG. 12. Further, the cross-polarization response is always zero. The spectrum at the receiver of the sphere target is seen in FIGS. 13 and 14. Since the sphere target produces no modulation the received spectrum is centered at $f_c$ for parallel-polarization and is zero magnitude for the cross-polarization.

The polarization modulation can be determined for other shaped targets, however the above two examples will be used to describe target-to-clutter discrimination. Consider the thin wire to be the target and the sphere to be the clutter (i.e., rain). The discrimination can easily be accomplished by simply receiving the parallel polarization and tuning the receiver to the frequency of $(f_c + 2f_R)$. Since no energy from the sphere appears at this frequency range only responses from the target will appear. A target-to-clutter enhancement has been achieved.

Although target-to-clutter enhancement was achieved in the above technique, the total energy from the target was not processed to obtain the optimum target-to-receiver noise ratio.

Another problem arises due to the radar range time delay. If a common oscillator is employed as a reference oscillator for rotating both the transmit and received, the range delay will increase the rotation of the received, polarization angle by $$\Delta\phi = \omega_R \tau$$

where $\tau$ is the radar range delay.
The radar range delay is $$\tau = 2R/c$$

where $R$ is the range to the target and $c$ is the velocity of propagation of the radiated signal. Therefore:

$$\Delta\phi = (2\omega_R R)/c.$$

Because $\omega_R$ is a relatively large number and the range to the target may be large, $\Delta\phi$ may also be large. Also the polarization error angle ($\Delta\phi$) varies with range. The problem is then that the parallel polarized and cross-polarized references will be lost.

To overcome both the problem of the loss of the polarization reference angle and maintaining an optimum target-to-receiver noise ratio, the following unique solution is given. The two orthogonal channels will be combined in a vector addition as to process all the energy in the desired modulation.

For purposes of discussion, a first preferred receiver is presented to aid in describing an effective rotating polarization by signal processing. It is understood that the receiver may be designed differently but will essentially perform the same idea and principle to obtain effective polarization rotation by signal processing.

Figure 15:
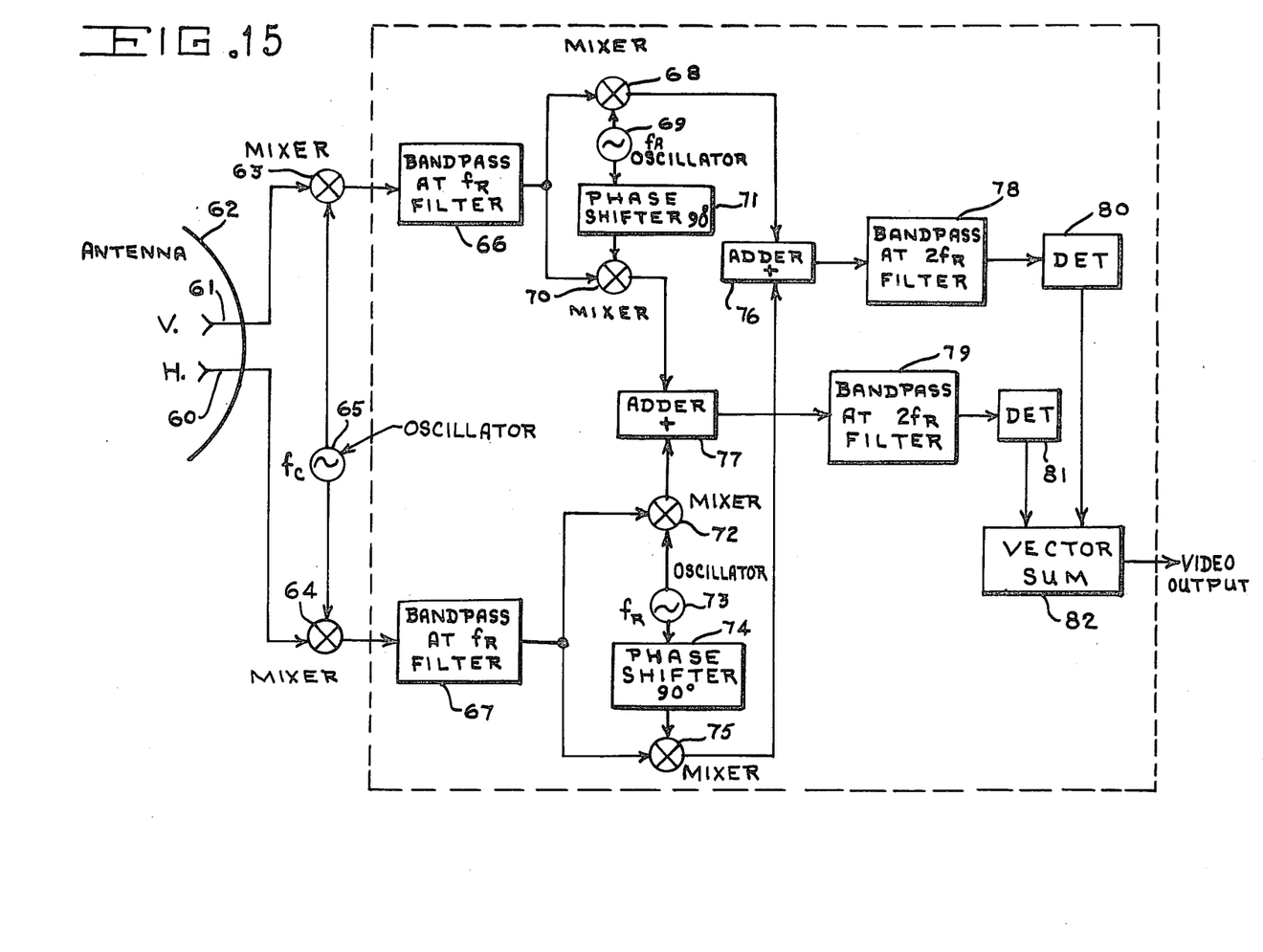
FIG. 15 illustrates in block diagram form one of the radar receivers.

The first preferred receiver is described with reference to FIG. 15. Here the output of horizontal and vertical feeds 60 and 61 of antenna 62 are mixed in mixers 63 and 64 with oscillator 65 whose frequency is $f_c$.

The outputs of mixers 63 and 64 are then passed through bandpass filters 66 and 67 with frequency response centered at $f_r$ with a bandwidth of $\Delta F$. First referring to the vertical channel, the output bandpass filter 66 feeds mixer 68 and is mixed with a signal from oscillator 69 with a frequency of $f_r$.

As mentioned earlier the polarization reference angle was lost because of radar range time delay. To overcome this problem quadrature mixing is performed where second mixer 70 is employed with a 90° phase shifter 71 between this mixer and the $f_r$ oscillator. The circuitry in the horizontal channel is identical to the description of the vertical channel up to this point of discussion. The horizontal channel further includes mixer 72, oscillator 73, 90° phase shifter 74 and mixer 75.

The horizontal and vertical channels are combined in a vector addition to maintain maximum signal energy. A unique approach is employed to perform this using simple circuitry. The outputs of the cross-orthogonal channels of both the vertical and horizontal polarization channels are in phase and can be added directly. That is to say, the output signal of mixer 68 is in phase with the output signal of mixer 75 and also the output signal of mixer 70 is in phase with the output signal of mixer 72. The outputs of simple adders 76 and 77 are filtered with bandpass filters 78 and 79 which are centered at 2$f_r$ and each have a bandpass of $\Delta F$. Filters 78 and 79 are the discriminating filters which reject the energy from the spheres.

The output of the adder is a signal processing equivalent to that of mechanically rotating the polarization of the antenna.

All the energy from the polarization modulation sidebands from the dipole will pass through the filters 78 and 79 maintaining the maximum signal ratio and maximum signal-to-receiver noise ratio.

The signals are then detected with conventional envelope detectors 80 and 81. Because these two signals are in quadrature (due to the quadrature demodulation with $f_r$) the vector sum is performed by taking the square root of the sum of the squares of the two video signals. If desired, an analog-to-digital converter may be placed just after the detector and the vector sum may be performed with digital processing. The output of the vector summer 82 will contain the dipole signal with the clutter (spheres) signals suppressed. The video output can be displayed in any conventional manner desired (i.e., PPI). The processing described above is of analog form and digital processing may be employed to perform the same processing if desired.

In the above description, both the transmitting and receiving polarization were rotating at the same angular rate. The principle also applies if the transmitting and receiving polarization rotational rate be $\omega_R$ and let the receiving polarization rate be $\omega_S$. The receiver shown in FIG. 15 is the same except for the following changes:

The reference quadrature oscillators at frequency $f_R$ are changed to the frequency of $f_S$ (where $\omega_S = 2\pi f_S$).

Filters 78 and 79 are changed to a center frequency of $f_R + f_S$ with a bandpass of $\Delta f$; otherwise, the remaining circuitry is the same as before with the principle of operation.

Figure 16:
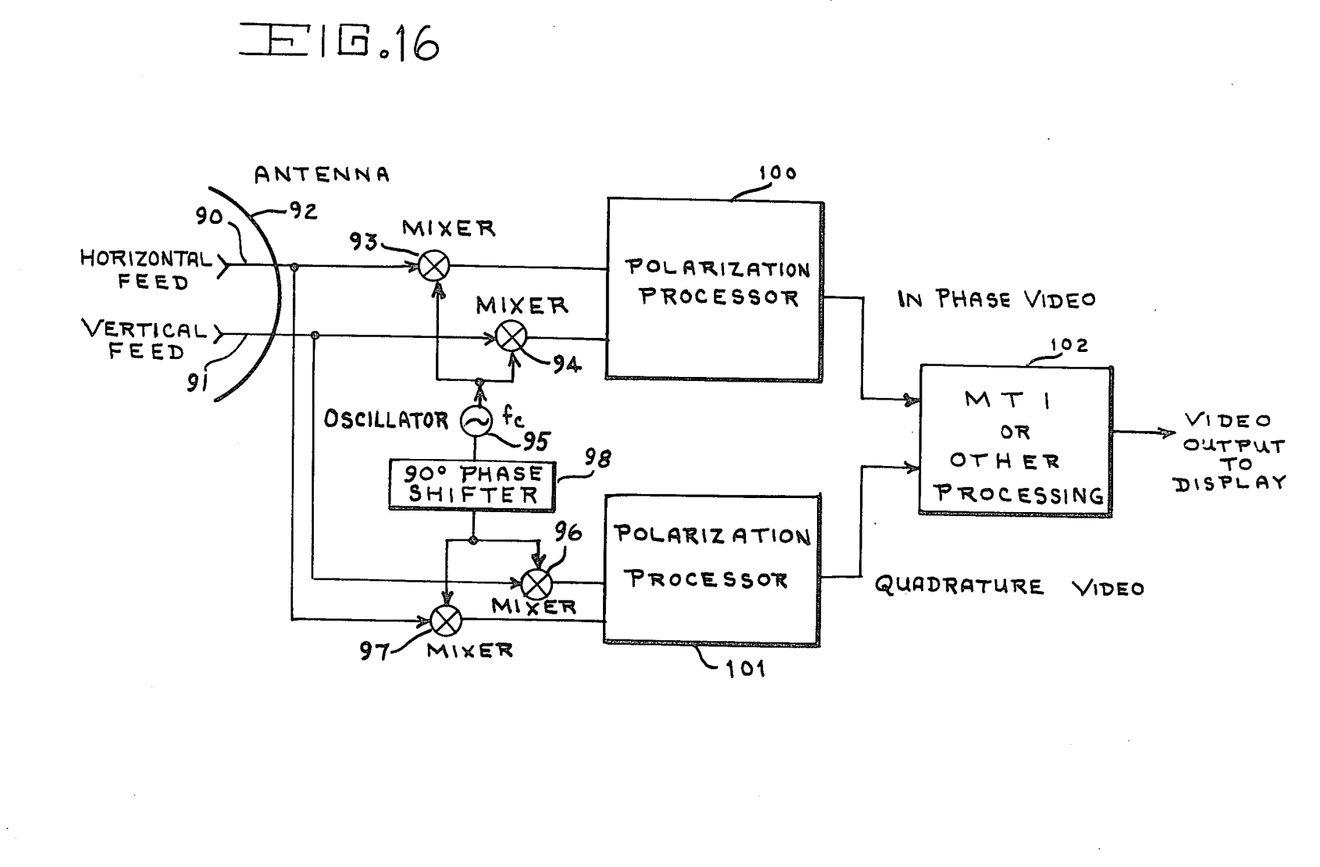
FIG. 16 illustrates in block diagram form a phase coherent reciever employing polarization discrimination in addition thereto in MTI or other processing.

A desirable feature of any signal processing technique is that it has the capability to be employed with other signal processing techniques. A unique feature of polarization processing is that, it can be employed with any phase-processing technique, where an MTI (Moving Target Indicator) is used as an example. This is described with reference to FIG. 16. In this diagram the horizontal and vertical signals from feeds 90 and 91 of antenna 92 are split into two channels; an in-phase and a quadrature channel. In-phase and quadrature is referred to the carrier frequency and should not be confused with the polarization channels. Each channel is processed in a polarization processor as was seen in FIG. 15. The outputs of the polarization processors 100 and 101 are then the in-phase and quadrature baseband video inputs to MTI processor 102. A quadrature relationship was obtained by a 90° phase shift in the reference oscillator 95, $f_c$, during mixing the quadrature channel. In this configuration the radar is phase coherent and any form of doppler filtering can be performed such as the MTI described above. It is noted that oscillator 95 feeds mixers 96 and 97, by way of 90° phase shifter 98. The outputs of mixers 93 and 94 feed polarization processor 100 and mixers 96 and 97 feed polarization processor 101.

Figure 17:
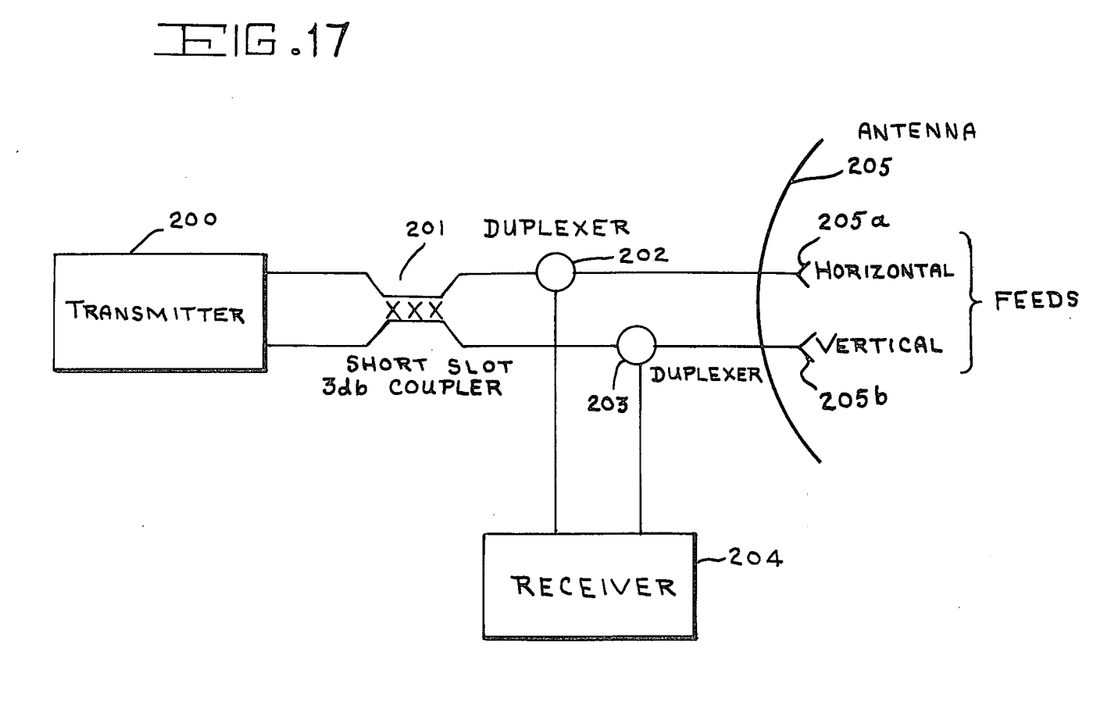
FIG. 17 shows in block diagram form a complete radar system with duplexing.

To complete the radar configuration, the duplexing of the receiver and transmitter is shown in FIG. 17. Two duplexers 202 and 203 are employed where a three-port circulator is used as an example duplexer. It is noted that any form of antenna 205 (i.e., phase array, reflector type) can be employed that has both the horizontal and vertical feeds 205a and 205b. The examples of circuitry described above did not contain any intermediate frequencies for ease of explaining the principles of this invention disclosure. However, they may be employed in the transmitter 200 and receiver 204 in the conventional manner.

In the illustrated radar system which is in simplified form there is shown transmitter 200 feeding short-slot hybrid coupler 201. Duplexers 202 and 203 receive the outputs from short-slot hybrid coupler 201 for passage exclusively for transmission by horizontal and vertical feed 205a and feed 205b of antenna 205. The reflected target signals are received by horizontal and vertical feeds 205a and 205b of antenna 205 and are fed by way of duplexers 202 and 203 exclusively to receiver 204.

What is claimed is:

1. A polarization radar modulation system being comprised of means to generate a pulse waveform, means to rotate the polarization of said pulse waveform at a very fast and constant angular rate, said polarization rotation rate being at least 360° during one pulse, first antenna means to direct the rotated pulse waveform toward a target of interest for reflection therefrom, second antenna means to receive the energy of the reflected signal, said received energy having the same polarization as the transmitted polarization and both rotating at a constant linear rate, a receiver connected to said second antenna means, said received signals containing frequency components other than transmitted and said receiver being tuned thereto to obtain target discrimination.

2. A polarization radar modulation system as described in claim 1 wherein said first antenna means includes a horizontal and vertical feed.

3. A polarization radar modulation system as described in claim 2 wherein the means to generate a pulse waveform is comprised of two pulsed oscillators.

4. A polarization radar modulated system as described in claim 3 wherein the polarization rotation means is comprised of a short-slot hybrid having first and second inputs and first and second outputs, said first and second inputs being connected to said first and second pulsed oscillators, respectively, and said first and second outputs being connected to said horizontal and vertical feeds, respectively.

5. A polarization radar modulation system as described in claim 4 wherein said second antenna means includes second vertical and horizontal feeds, said receiver being comprised of first and second mixers connected to said second vertical and horizontal feeds, respectively, a first oscillator of preselected frequency connected simultaneously to said first and second mixers, first and second bandpass filters operating at identical frequencies, third, fourth, fifth and sixth mixers, said third and fourth mixers receiving the output of said first bandpass filter, said fifth and sixth mixers receiving the output of said second bandpass filter, a second oscillator of a preselected frequency, a first 90° phase shifter in a first series combination with said second oscillator, said first series combination interconnecting said third and fourth mixers, a third oscillator of a preselected frequency, a second 90° phase shifter in a second series combination with said third oscillator, said second series combination interconnecting said fifth and sixth mixers, first means to add the outputs from said fourth and fifth mixers, second means to add the outputs of said third and sixth mixers, first and second detector means, third and fourth bandpass filters operating at twice the frequency of said first and second bandpass filters, said third and fourth bandpass filters interconnecting said first and second adding means and said first and second detectors, respectively, and vector summing means receiving the output signals from said first and second detectors.

6. A polarization radar modulation system as described in claim 2 wherein said means to generate a pulse waveform is comprised of a first oscillator of a first preselected frequency, a second oscillator of a second preselected frequency, upper and lower sideband signal generators each receiving simultaneously signals of said first and second preselected frequency, first and second power transmitters receiving the outputs of said upper sideband and lower sideband generators, respectively.

7. A polarization radar modulation system as described in claim 6 wherein the means to rotate polarization is comprised of a short-slot hybrid having first and second inputs and first and second outputs, said first and second inputs being connected to said first and second power transmitters, respectively, and said first and second outputs being connected to said horizontal and vertical feeds, respectively.

8. A polarization radar modulation system as described in claim 7 wherein said second antenna means includes second vertical and horizontal feeds, said receiver being comprised of first and second mixers connected to said second vertical and horizontal feeds, respectively, a first oscillator of preselected frequency connected simultaneously to said first and second mixers, first and second bandpass filters operating at identical frequencies, third, fourth, fifth and sixth mixers, said third and fourth mixers receiving the output of said first bandpass filter, said fifth and sixth mixers receiving the output of said second bandpass filter, a second oscillator of a preselected frequency, a first 90° phase shifter in a first series combination with said second oscillator, said first series combination interconnecting said third and fourth mixers, a third oscillator of a preselected frequency, a second 90° phase shifter in a second series combination with said third oscillator, said second series combination interconnecting said fifth and sixth mixers, first means to add the outputs from said fourth and fifth mixers, second means to add the outputs of said third and sixth mixers, first and second detector means, third and fourth bandpass filters operating at twice the frequency of said first and second bandpass filters, said third and fourth bandpass filters interconnecting said first and second adding means and said first and second detectors, respectively, and vector summing means receiving the output signals from said first and second detectors.

* * * * *